United States Patent [19]
Botto

[11] Patent Number: 5,249,813
[45] Date of Patent: Oct. 5, 1993

[54] SEALING RING STRUCTURE
[75] Inventor: Paolo Botto, Lainate, Italy
[73] Assignee: Dixon Resine S.p.A., Milan, Italy
[21] Appl. No.: 835,512
[22] Filed: Feb. 14, 1992
[30] Foreign Application Priority Data
  Jul. 5, 1991 [EP] European Pat. Off. ......... 91830301.7
[51] Int. Cl.[5] ............................................. F16J 15/16
[52] U.S. Cl. ....................................... 277/165; 277/27; 277/176; 277/177
[58] Field of Search ............... 277/165, 157, 176, 177, 277/168, 27, 173

[56] References Cited
U.S. PATENT DOCUMENTS

| | | | |
|---|---|---|---|
| 2,930,608 | 3/1960 | Hogan et al. | 277/27 X |
| 3,268,235 | 8/1966 | Jacobellis | 277/165 |
| 3,909,016 | 9/1975 | Traub et al. | 277/165 |
| 4,917,390 | 4/1990 | Lee et al. | 277/165 |
| 4,953,876 | 9/1990 | Müller | 277/165 |
| 5,082,295 | 1/1992 | Wetzel | 277/165 |
| 5,092,610 | 3/1992 | Dunham et al. | 277/165 X |
| 5,104,131 | 4/1992 | Edlund et al. | 277/165 X |

FOREIGN PATENT DOCUMENTS

| | | |
|---|---|---|
| 0431325 | 6/1991 | European Pat. Off. |
| 3026063 | 2/1982 | Fed. Rep. of Germany ...... 277/165 |
| 3606886 | 9/1987 | Fed. Rep. of Germany ...... 277/165 |
| 1413336 | 7/1988 | U.S.S.R. ............................... 277/165 |
| 2177464 | 1/1987 | United Kingdom ................ 277/165 |

Primary Examiner—William A. Cuchlinski, Jr.
Assistant Examiner—James K. Folker
Attorney, Agent, or Firm—Sughrue, Mion, Zinn, Macpeak & Seas

[57] ABSTRACT

A sealing ring structure for effecting a fluid seal between a stationary member having an annular groove and a cylindrical member having a longitudinal axis movable relative to the groove includes a sealing ring disposed in the groove along with an outer annular stressing member disposed radially outwardly of the sealing ring and biasing the sealing ring into engagement with the cylindrical member. The sealing ring has an end surface facing a low pressure side of the groove and an outer surface in contact with the stressing member. The end surface and the outer surface intersect to form an edge in circular line contact with the low pressure side of the groove. The end surface is inclined toward a high pressure side of the groove with respect to a line perpendicular to the axis of the movable member and the outer surface is inclined with respect to a direction parallel to the axis of the movable member.

3 Claims, 3 Drawing Sheets

SEALING RING STRUCTURE

BACKGROUND OF THE INVENTION

This invention relates to a for effecting a fluid seal between a couple of members one of which is movable with respect to the other, comprising an outer annular stressing section radially biasing against a concentric inner sealing section, along an outer surface thereof.

More particularly, the present invention refers to a mono-directional composite seal (MCS) for reciprocating motions which finds a preferred use as a packing for hydraulic cylinders for effecting a fluid seal around piston rods.

The invention is applicable to sealing ring structures comprising a tough elastic sealing ring which may be of any suitable thermoplastic substance, i.e. a polymer selected from the group comprising: polytetrafluoroethylene, ultrahigh-molecular-weight polyethylene (UHMW-PE), polyester elastomers and a separate highly elastic stressing ring for pressing radially on the sealing ring and preferable consisting of an elastomeric material such as rubber, or to integral structures having a sealing section produced from an elastic material or a combination of materials to provide a tough elastic sealing section and an integral highly elastic stressing section.

In the case of piston rod seals of the above nature and, more generally, in the case of seals interposed between a stationary and a movable member, it is necessary to control and maintain to a limited amount the drag flow of the hydraulic fluid during reciprocating displacement.

To this end, the sealing ring structures are provided with a sealing ring and a stressing ring, or a sealing section and a stressing section in the case of integral structures, which are commonly situated together within a groove or recess of the housing (for a rod seal) or of the piston (for a piston seal).

Typical examples of sealing ring structures of the above kind are described in U.S. Pat. Nos. 3,942,806 and U.S. Pat. No. 4,449,718.

These known structures comprise a stressing ring consisting of a rubber-elastic ring of circular (O-ring) or rectangular cross-section, which extends coaxially with and surrounds the sealing ring which generally has a substantially rectangular cross-section.

As a result of radial prestressing of the stressing ring between the bottom of the groove and the external surface of the sealing ring in contact with the stressing ring, the following effects are achieved:

a) a dynamic sealing between the stationary and movable members, for example between the stationary part of a cylinder and a reciprocating rod;

b) the secondary leakage path between the sealing ring and the bottom of the groove and the sealing ring is closed.

As a general rule, the dynamic sealing between the stationary and reciprocating members is obtained by shaping the inner surface of the sealing ring so as to have an annular sharp edge which provides, in operation, a contact surface as limited as possible with the movable member.

This annular edge, adapted to slidably engage the movable member, is defined by the intersection of a recess open towards the high pressure side of the seal and a radially inclined conical surface open towards the low pressure side of the seal.

This contact surface, generates a very steep rise of the contact pressure, i.e. a high pressure gradient, between the sealing ring and the mating surface of the movable member, with respect to the direction from the high pressure side to the low pressure side of the seal. The high pressure gradient thereby generated limits the drag flow of the hydraulic fluid which takes place when the movable member moves outward (i.e. towards the low-pressure side of the seal) with respect to the stationary member.

The radially inclined conical surface makes on the contrary low the pressure gradient between the sealing ring and the mating surface of the movable member, with respect to the direction from the low pressure side to the high pressure side of the seal. Consequently, this arrangement favours the dragging of the hydraulic fluid layer back again into the stationary member when the movable member moves inwards.

Practical experience has shown that conventional MCS performance is affected by a series of drawbacks.

A first of such drawbacks is that the sealing ring is forced to rotate toward the low-pressure side of the seal by the action of the force exerted onto the outer surface thereof by the stressing ring, as well as by the hydraulic fluid pressure applied to its high-pressure surface.

As a consequence, the length of the contact surface which engages the movable member, may be extended up to a value which allows for a noticeable leakage to take place.

A second drawback of conventional MCS is the progressive plastic deformation of the sealing ring cross section caused by the pressure applied on its outer surfaces. This deformation is particularly noticeable in proximity of an outer edge of the radially inclined conical surface facing the low pressure side of the seal.

This deformation may in some cases result in the extrusion of the sealing ring material into the clearance volume between the stationary member and the moving member. This phenomenon could give rise in turn to breakages of the extruded material in fragments which affect the seal integrity and the seal performance.

SUMMARY OF THE INVENTION

The technical problem underlying the present invention is that of providing a sealing ring structure showing an improved sealing performance during reciprocating displacement of the movable member with respect to the stationary member.

This problem is solved according to the invention by sealing ring structure for effecting a fluid seal between a couple of members one of which is movable with respect to the other, comprising an outer annular stressing section radially biasing against a concentric inner sealing section along an outer surface thereof, characterized in that at least a portion of said surface is inclined with respect to a direction parallel to the axis of the movable member.

BRIEF DESCRIPTION OF THE DRAWINGS

Further characteristics and the advantages of the invention will be more readily apparent from the following description of some preferred embodiments thereof, which will be given by way of non limitative example with reference to the annexed drawings in which.

DETAILED DESCRIPTION OF THE INVENTION

Figure 1:
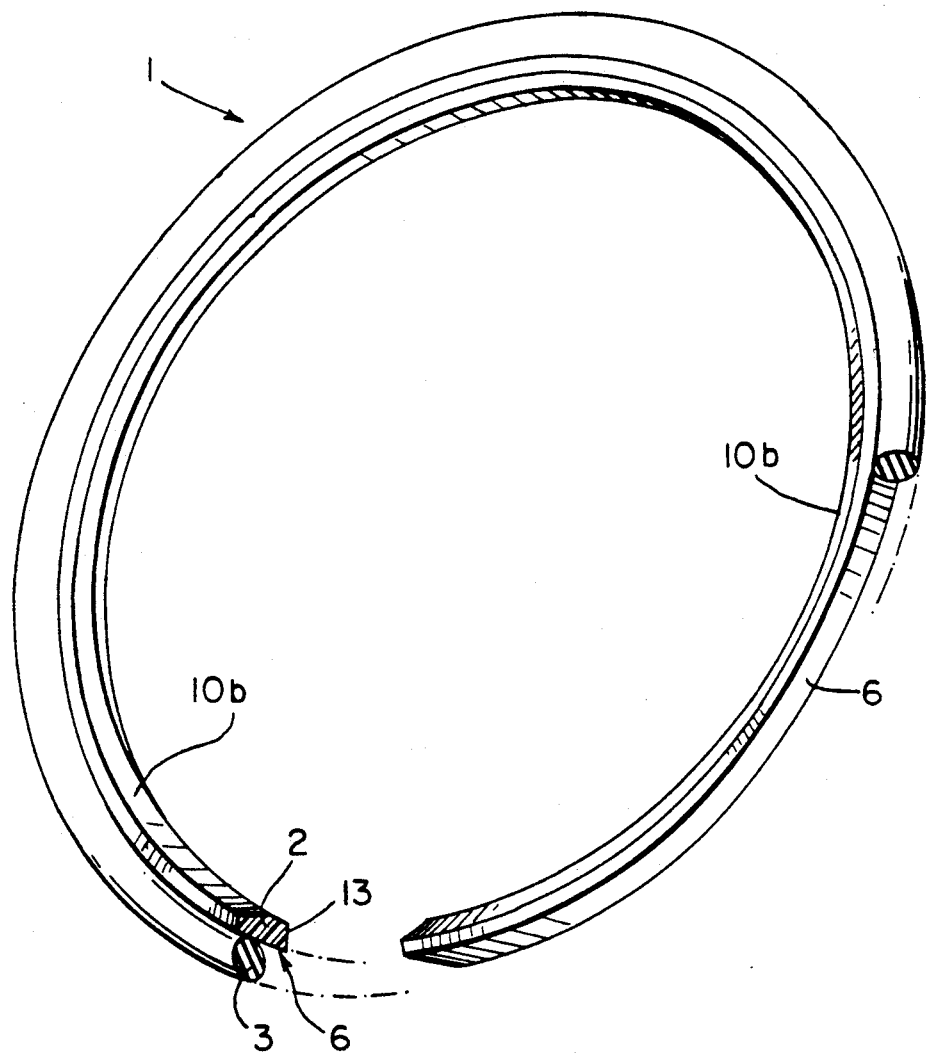
FIG. 1 is a perspective view, in partial section, of a sealing ring structure according to the invention.

With reference to the above mentioned figures, with 1 is indicated a sealing ring structure according to the invention.

The sealing ring structure 1 comprises an annular sealing section 2 and a concentric stressing section 3 arranged coaxially with respect to the sealing section 2.

In the embodiments of the invention illustrated hereinbelow, the sealing section 2 and the stressing section 3 are in the form of independent rings having respectively a substantially rectangular and a substantially circular cross-section.

The sealing ring 2 consists of a tough resilient synthetic material based on polytetrafluoroethylene, whereas the stressing ring 3 consists of a rubber material.

The two rings are inserted in a groove 4, which is formed in a stationary machine part, for example in a cylinder 5.

The stressing ring 3 exerts a radially directed biasing force on the sealing ring 2 along an outer annular surface 6 thereof and at the same time seals it off in the groove 4 of the cylinder 5.

Figure 3:
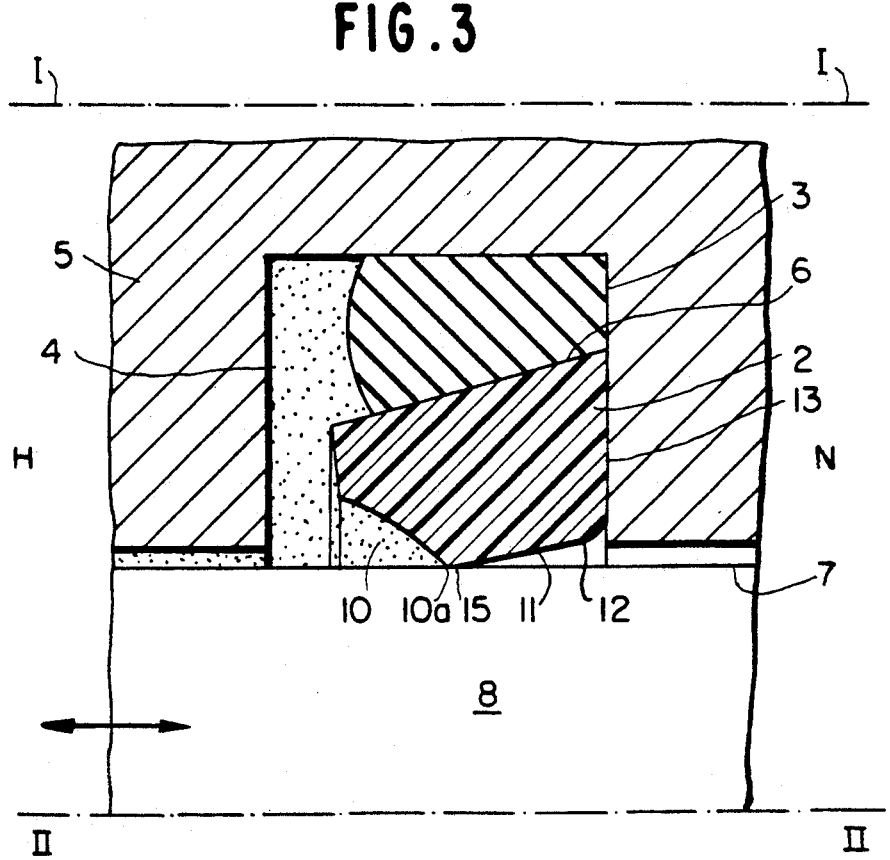
FIG. 3 is a cross-section through a sealing ring structure according to the invention in an operative condition thereof.

As a consequence of the radially directed biasing force of the stressing ring 3, the sealing ring 2 is in contact with the outer surface 7 of a movable member, i.e. a piston rod 8 which is displaceable with respect to it according to a to-and-from movement indicated by the double arrow in FIG. 3.

With I—I and II—II are respectively indicated a longitudinal axis of the cylinder 5 and of the rod 8 between which the sealing ring structure 1 effects a fluid seal.

Figure 2:
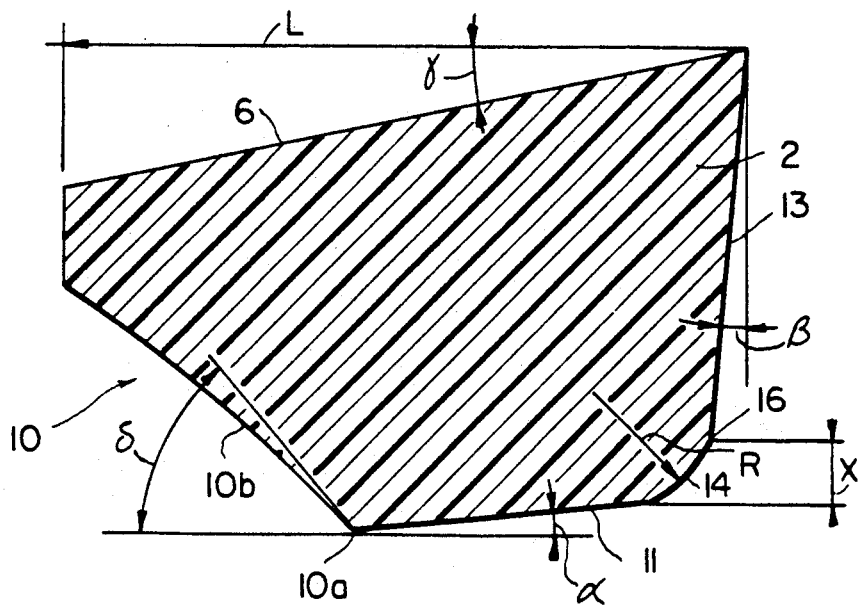
FIG. 2 is a cross-section of a portion of the sealing ring structure of FIG. 1.

As it is apparent from the annexed FIG. 2, the cross-section of the sealing ring 2 has a tapered configuration, the surface 6 being inclined, with respect to a direction parallel to the axis II—II of the rod 8 at an angle gamma ranging from 8° to 15° and more preferably from 11° to 13°.

On its inner peripheral surface opposed to the surface 6, the sealing ring 2 comprises an annular recess 10 open towards the high pressure side H of the sealing ring structure 1.

Adjoining the recess 10 on the low pressure side N of the sealing ring structure 1 is an inclined surface 11 which defines a wedge-shaped annular gap 12 which diverges in the direction towards an end surface 13 of the sealing ring 2 facing the low pressure side N.

The angle alpha of the annular gap 12 is small because of the desirable gentle pressure drop at the low-pressure side N within the area of contact which increases at higher pressure as a consequence of a tilting movement of the sealing ring, and preferably amounts from 0° to 8°, more preferably between 3° and 5°.

The end surface 13 facing the low pressure side N is in turn inclined with respect to a direction perpendicular to the axis II—II of the rod 8, at angles beta varying from 8° to 15°, more preferably between 10° and 12°.

The inclined surface 11 and surface 13 of the sealing ring 2 are joined together through a curved edge 14 having a radius of curvature R. The value of R is such that the curved edge is tangent to the inclined surface 11 and intersects the end surface 13 along a line 16.

Said radius is preferably comprised between 0.10 and 0.25 times the total longitudinal length L of the sealing ring 2 as measured along a direction parallel to the axis II—II of the rod 8. More preferably, said radius R ranges from 0.12 to 0.20 L.

The position of the centre of curvature of the round edge 14 is choosen in a way that the distance X measured along the radial axis of the sealing ring structure, between the intersection line 16 and the tangent point with the inclined surface 11, is comprised between 1.0 and 1.5 the maximum allowed gap between the cylinder 5 and the rod 8. More preferably, the distance X is comprised between 1.1 and 1.3 said maximum allowed gap.

A bottom 10b of the recess 10 and the inclined surface 11 define a sharp edge 10a which slidably engages the outer surface 7 of the rod 8.

In operation, the profile of the sealing ring 2 is elastically deformed so that a contact surface 15 is generated adjacent to the sharp edge 10a.

The bottom 10b of the recess 10 is inclined with respect to a direction parallel to the axis II—II of the rod 8 at an angle delta varying from 50° to 60° and more preferably from 50° to 55°.

In operation, the configuration of the sealing ring structure 1 and more particularly that of the sealing ring 2, according to the invention is modified as shown in FIG. 3 wherein the extent of the deformation to which either the stressing ring 3 or the sealing ring 2 are subjected is evident.

The deformed configuration shown in FIG. 3 is reached, while the hydraulic fluid attains its maximum pressure, through modifications of the sealing ring 2: the surface 13 is firstly pushed against the facing wall of the groove 4 and then the inclined surface 11 is deformed so as to generate the contact surface 15.

When the hydraulic fluid has reached its maximum pressure, the sealing ring structure 1 according to the invention reaches a configuration wherein the taper angle beta reduces to zero and alpha assumes a value equal to the sum of the initial values of alpha and beta.

The configuration is such that in every operating condition, which may occur in practice, the contact surface 15 and the areal pressure between the sealing ring and the rod 8 will assure a correct gradient profile avoiding leakage of the hydraulic fluid.

This is mainly attributable to the presence of the taper angle gamma of the surface 6, which limits to a great extent the clockwise rotation of the sealing ring 2 which is responsible, in conventional MCS, for the alteration of the contact surface 15 up to a value at which considerable leakage takes place. To further enhance this effect, the sealing ring 2 of the present invention is also advantageously provided with a tapered end surface 13.

Advantageously, the presence of the round edge 14 will further reduce the possibility that extrusion of any part of the sealing ring 2 facing the low pressure side N of the sealing ring structure 1 may take place.

The round edge 14 is in fact in any operative condition moved away from the clearance volume defined between the cylinder 5 and the outer surface 7 of the rod 8 wherein, in conventional MCS, extrusion of the sealing ring may occur.

Experience has shown that the sealing ring structure configuration is geometrically stable and not prone to rotation independently from the working conditions of the seal.

Figure 4:
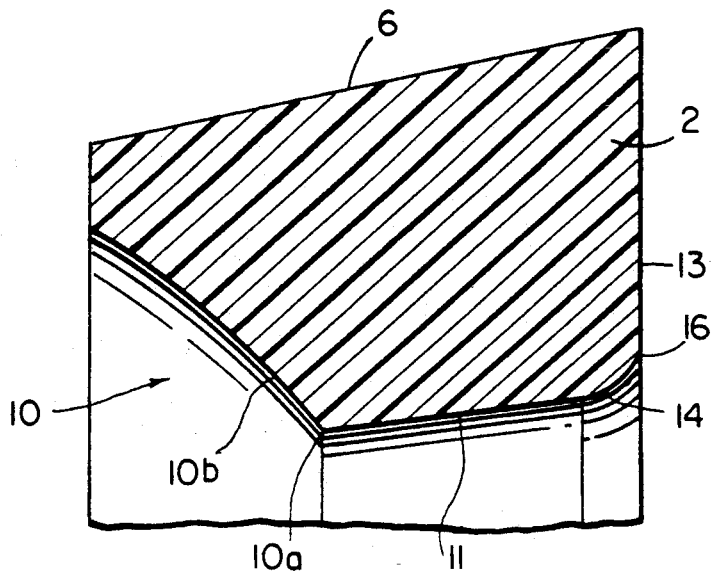
FIGS. 4–6 are cross-sections through portions of alternative embodiments of the sealing ring structure of FIG. 1.
Figure 5:
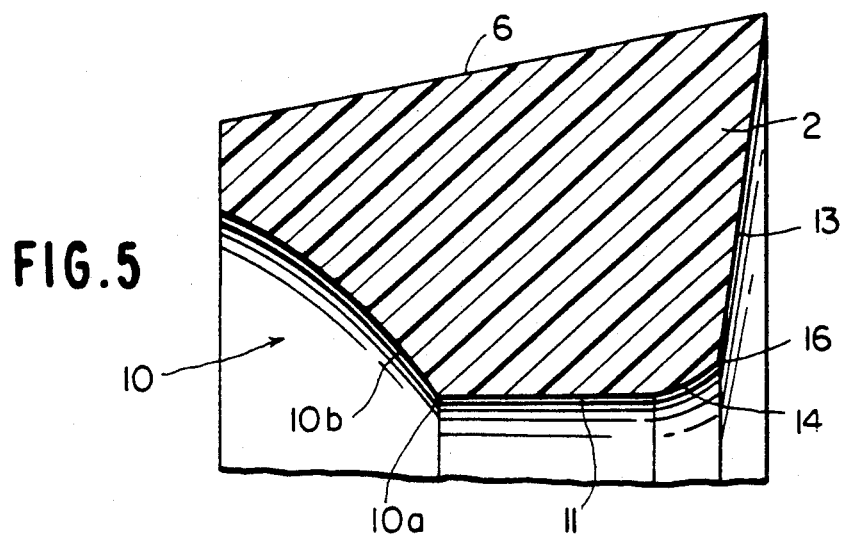
Figure 6:
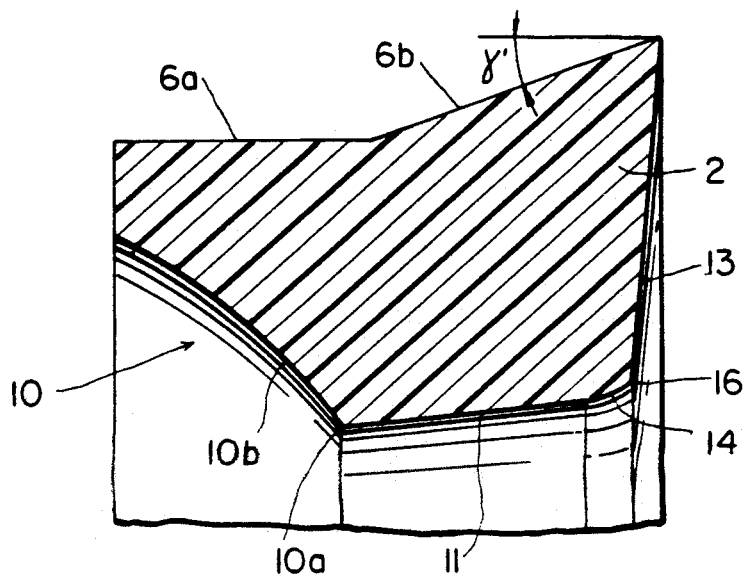

With reference to FIGS. 4-6 alternative forms of the sealing ring 2 will be described.

In the embodiment shown in FIG. 4, the end surface 13 facing the low pressure side N of the sealing ring structure 1 has no taper and thus the value of the angle beta is 0.

In the embodiment shown in FIG. 5, the surface 11 is no longer inclined and thus the angle alpha assumes a value of 0°.

The necessary tapering of the surface 11 so as to provide the sharp edge 10a and thus a correct contact surface 15 with the rod 8 is obtained by the action of the hydraulic fluid pressure which pushes the end surface 13 of the sealing ring against the facing side of the groove 4. This counterclockwise movement of the sealing ring 2 is made possible by the presence of the angle beta.

As a consequence, in operation a taper angle alpha equal to the initial value of beta is obtained.

In a third embodiment of the sealing ring 2 of the invention, the surface 6 onto which the stressing ring 3 exerts its radially directed biasing force, comprises adjacent portions 6a, 6b. The first portion 6a is substantially parallel to the axis II—II of the rod 8, while the second portion 6b is inclined with respect to a direction parallel to said axis II—II at an angle gamma' having a value of from 16° to 20°, preferably of 18°.

All the embodiments of the sealing ring structure 1 of the present invention, have shown a performance substantially apt to assure in any operative condition, which may occur in practice, a correct sealing action without leakage and/or damages to the sealing ring 2.

I claim:

1. A sealing ring structure for effecting a fluid seal between a stationary member having an annular groove and a cylindrical member having a longitudinal axis movable relative to said groove, a sealing ring disposed in said groove, an outer annular stressing member disposed in said groove radially outwardly of said sealing ring and biasing said sealing ring into engagement with said cylindrical member, said sealing ring having an end surface facing a low pressure side of said groove and an outer surface in contact with said stressing member, said end surface and said outer surface intersecting to form an edge in circular line contact with said low pressure side of said groove with said end surface being inclined toward a high pressure side of said groove with respect to a line perpendicular to the axis of the movable member and said outer surface being inclined with respect to a line parallel to the axis of the movable member whereby upon application of pressure to a high pressure side of said sealing ring, the sealing ring will pivot about said edge to bring said end surface into full engagement with said low pressure side of said groove; and wherein said sealing ring has an inner surface having first and second portions angled in opposite directions relative to a line parallel to said axis of said movable member and which meet at an edge disposed in substantially line contact with said cylindrical movable member with said line contact being the only contact of said sealing ring with said cylindrical movable member upon application of pressure to said high pressure side of said sealing ring.

2. A sealing ring structure as set forth in claim 1, wherein said end surface is connected to inner surface of said sealing ring through a rounded edge portion.

3. A sealing ring structure as set forth in claim 2, wherein said rounded edge portion has a radius of curvature varying from 0.10 to 0.25 L where L is the total longitudinal length of the sealing ring.

* * * * *